United States Patent [19]
Hosoe et al.

[11] 3,999,192
[45] Dec. 21, 1976

[54] FOCUS DETECTING SYSTEM

[75] Inventors: Kazuya Hosoe, Kawasaki; Seiichi Matsumoto, Tokyo, both of Japan

[73] Assignee: Canon Kabushiki Kaisha, Tokyo, Japan

[22] Filed: Nov. 1, 1974

[21] Appl. No.: 520,134

Related U.S. Application Data

[63] Continuation of Ser. No. 343,211, March, 1973, which is a continuation of Ser. No. 146,957, May, 1971, abandoned.

[30] Foreign Application Priority Data

| May 27, 1970 | Japan | 45-45812 |
| May 27, 1970 | Japan | 45-45813 |
| May 27, 1970 | Japan | 45-45814 |

[52] U.S. Cl. .................... 354/25; 250/201; 352/140; 356/4
[51] Int. Cl.² ............................................. G03B 3/00
[58] Field of Search .................. 354/25, 31, 195; 352/140; 250/201, 204; 353/101; 178/DIG. 29; 356/4, 1

[56] References Cited

UNITED STATES PATENTS

| 3,249,006 | 5/1966 | Stauffer | 352/140 X |
| 3,442,193 | 5/1969 | Pagel | 354/25 |
| 3,603,800 | 9/1971 | Andres et al. | 250/578 |
| 3,610,934 | 10/1971 | Turner | 250/201 |
| 3,652,784 | 3/1972 | Wupper et al. | 356/4 X |

OTHER PUBLICATIONS

Camera's Infrared Eye Focuses on New Vistas for Ranging; Electronics, vol. 43, No. 9, Apr. 1970, pp. 102–105.

*Primary Examiner*—Joseph W. Hartary
*Attorney, Agent, or Firm*—Toren, McGeady and Stanger

[57] ABSTRACT

In the system disclosed, a cylindrical lens or mirror compresses the image of an object illuminated by a beam, and a movable mirror coupled to the lens barrel of a lens system reflects the compressed image onto the dividing line between two photosensors. The unbalance between the outputs of the photosensors indicates the defocus of the lens system. A servo responds to the unbalance to refocus the system by moving the lens barrel and the mirror until the photosensor outputs are balanced.

12 Claims, 13 Drawing Figures

FOCUS DETECTING SYSTEM

This is a continuation of application Ser. No. 343,211 filed Mar. 21, 1973, which, in turn, was a continuation of application Ser. No. 146,957 filed May 26, 1971, now abandoned.

BACKGROUND OF THE INVENTION

The present invention relates to a system for automatically detecting and setting the focus of an optical system.

Heretofore many methods have been proposed wherein focus detection is performed by radiating a beam or ray from a ray or light emitting device fixed on an apparatus. The light is reflected by an object to be detected and then sensed by a light or ray receiver. However, when this kind of system is actually used, the amount of the incident light entering the ray receiver varies over an extensive range on the basis of the difference in the distance to an object or on the refractive mirror of the apparatus.

The operating range of an electronic circuit must be quite extensive. Unless this is so the function of entire system is apt to become unstable and great difficulties may be encountered.

SUMMARY OF THE INVENTION

The present invention provides a new method and means to control the sensitivity of focus detection of the system according to the amount of the incident ray entering the ray receiver. At the same time the energy of the ray in the focus detection is used for the purpose of overcoming the difficulties mentioned above and facilitating the focus detection.

The sensitivity in focus detection is enhanced by arranging the system so that the ray flux impinging on the ray receiver is compressed along on dimensions transverse to propagating direction so that the cross section of the resulting light beam has a substantially closed outline with one axis considerably longer than the other. At the same time, when the state of an object makes automatic focus detection impossible, the optical system is rapidly set at a predetermined suitable position. Thus, a setting of the position of an optical system that is satisfactory in every case can be secured.

Furthermore, when an object is of such a nature as a collection of leaves and fine lines, etc., the state of the ray impinging on the ray receiver sometimes becomes unsuitable for detection of focus. Therefore a a cylindrical lens capable of elongating the image in a linear direction to the front of the ray receiver is employed to prevent this inconvenience.

In the present invention, a reflux linearizor within a ray receiver optical system serves to have the ray flux impinging on the ray receiver collected i.e. cross-sectionally compressed, in one direction. For example use is made of a cylindrical lens within the ray receiver optical system, for the purpose of enhancing the focus detecting sensitivity by making the light impinging on the ray receiver a linear flux, the section of which has a substantially closed outline with one dimension considerably longer than the other. Alternately the ray flux impinging on the ray is compressed in one direction using a cylindrical mirror in place of the cylindrical lens, so as to provide a linear flux, i.e. a flattened beam. Moreover, said both methods and means can be used concurrently to improve the effect of flux linearization.

According to another feature of the invention, the shape and structure of the filament of the lamp is defined when the ray source itself is used as flux linearizor. Improving the electrode arrangement of a discharge tube, and the shape of tube, and the method of defining luminescent portion of a solid luminescent element are also contemplated. According to another feature of the invention the ray source of a ray projecting optical system uses a spherically shaped reflective mirror having a rectangular opening, or a cylindrical lens.

What has been explained above pertains mainly to situations when the ray source flux which impinges on the ray receiver has an elongated cross section. To achieve the above, a slit shaped opening may be provided at the camera either in the light path from the projector or in the path of light from the object. The former is more effective in forming a focus detecting system for enhancing the efficiency in using the ray source energy compared to the latter. According to the experiments conducted by the inventor it has been found advantageous to make the ratio of the short dimension of the linear ray flux relative to the long dimension of the same as small as possible consistent with other conditions for enhancing the focus detectability. When this ratio is reduced for example to one-half without changing other conditions, the focus detectability is almost doubled.

The details of the present invention are made clear in the drawings.

BRIEF DESCRIPTION OF THE DRAWINGS

FIG. 8 shows a portion of the system in FIG. 6 of X—X section as viewed in the direction of arrows.

DESCRIPTION OF PREFERRED EMBODIMENTS

Figure 1:
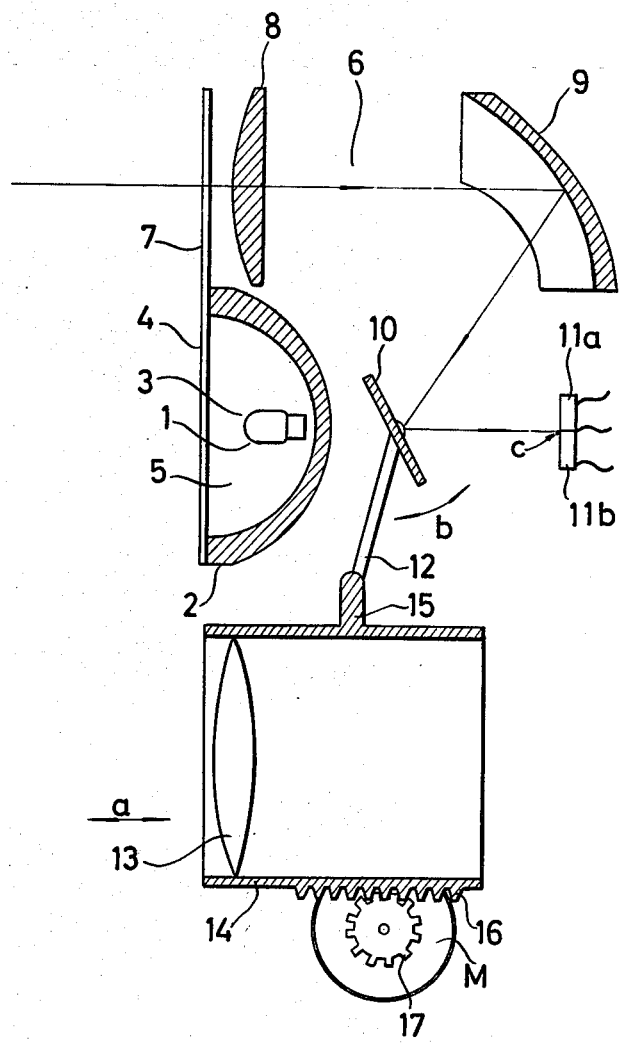
FIG. 1 is a cross sectional view of an example showing the arrangement of the system according to the present invention.

In FIG. 1, a lamp 1 is placed at a focal point of a spherical mirror 2 or a rotating parabolic mirror, and the ray flux generated by the lamp is projected along parallel lines. Further a condensing lens 3 is provied at the top of the lamp 1 to prevent scattering of the direct ray. A filter 4 is provided in front of the lamp for limiting the range of the wave length of the ray flux. This filter 4 can suitably selected so that a visible ray shielding filter is used when the ray flux should be infrared ray. A ray receiver system 6 is provided along with the projector 5 which consists of the above mentioned members. A filter 7 is provided for shielding noise rays having wave length ranges different from that of the light projected from the top of the ray receiver system 6. This filter 7 can naturally be provided in common with the above mentioned filter 4. At the rear of the filter 7, a cylindrical lens 8 and a fixed spherical mirror 9 causes the rays collectively to impinge linearly on the ray receiver. A swingable totally reflective mirror 10 which is placed at a suitable distance away from the optical axis of the cylindrical lens 8 causes the ray to collectively impinge linearly on the ray receiver. Photo-electric elements 11a, 11b form the ray receivers. The cylindrical lens 8 has an axis perpendicular to the paper surface and compresses the ray reflected by an object. Therefore, it changes the image of the object to a linear image extending perpendicular to the paper surface. The linear image is enlarged and focused again by the spherical mirror 9. The position of the totally reflective mirror 10 is set so that the imaging position of linear image focused by the mirror 9 is always on or near the ray receivers 11a and 11b which have a dividing line C being perpendicular to paper surface and face the incident light. The center of the totally reflective mirror 10 is so arranged that it is fixed in union with the rotating center of an arm 12 which forms a mechanically coupled mechanism with a projection 15 of a specular bronze or lens barrel 14 holding the optical system 13. The mirror 10 rotates to swing as shown by an arrow b along with the shifting of the lens barrel 14 in the direction shown by an arrow a. A rack 16 is fixedly provided on the lens barrle 14. A gear 17 engages the rack 16. A servo-motor M rotates the gear 17 so that the barrel 14 moves back and forth in the direction of the arrow a.

The invention may be embodied otherwise. For example, according to one embodiment, the cylindrical lens 8 is replaced with an ordinary lens and the spherical mirror 9 is replaced by a cylindrical mirror.

In operation, the ray flux generated by the lamp 1 is imparted directivity by the action of the spherical mirror 2 or by the action of the rotating parabolic mirror and the condensor lens 3. The filter 4 allows only light flux having specific range of wave lengths to on an object. The light flux reflected from the object is formed into a linear image, i.e. an elongated image, by the cylindrical lens 8 when it impinges on the ray receiver system 6. The light is further enlarged and imaged again by the spherical mirror 9 and is imaged as linear image on or near the light receivers 11a and 11b through the totally reflective mirror 10. The position of the image generated at the spherical mirror 9 on an optical axis of the spherical mirror varies depending on the distance from the projector 5 to the object. Thus, the linear image generated on the ray or light receivers 11a and 11b, after being reflected by the totally reflective mirror 10 will, when the totally reflective mirror 10 is fixed, be shifted on the ray receiver according to the position of the object. According to one example the image of an object is properly imaged at a prescribed position by the optical system 13 when the linear image falls on the dividing line C of the ray receiver. The position of the linear image will be disturbed as the object is shifted causing unbalance in the output of the ray receivers. Thus the optical system and the totally reflective mirror 10 move and rotate in response to the servo-mechanism to be described later and the linear image can be made to fall on the dividing line C of the ray receivers.

Furthermore, since the direction of movement of the elongated linear image when the object approaches the optical system is opposite to that when the object moves away from the optical system, there will be a directivity in the unbalance of the output of the ray receiver. By utilizing this difference to control the direction of rotation of the servo- motor M which provides an output for the servo-mechanism, the shifting direction of the object can be continuously sensed. Thus the optical system can always be retained at a proper focusing position.

Figure 2:
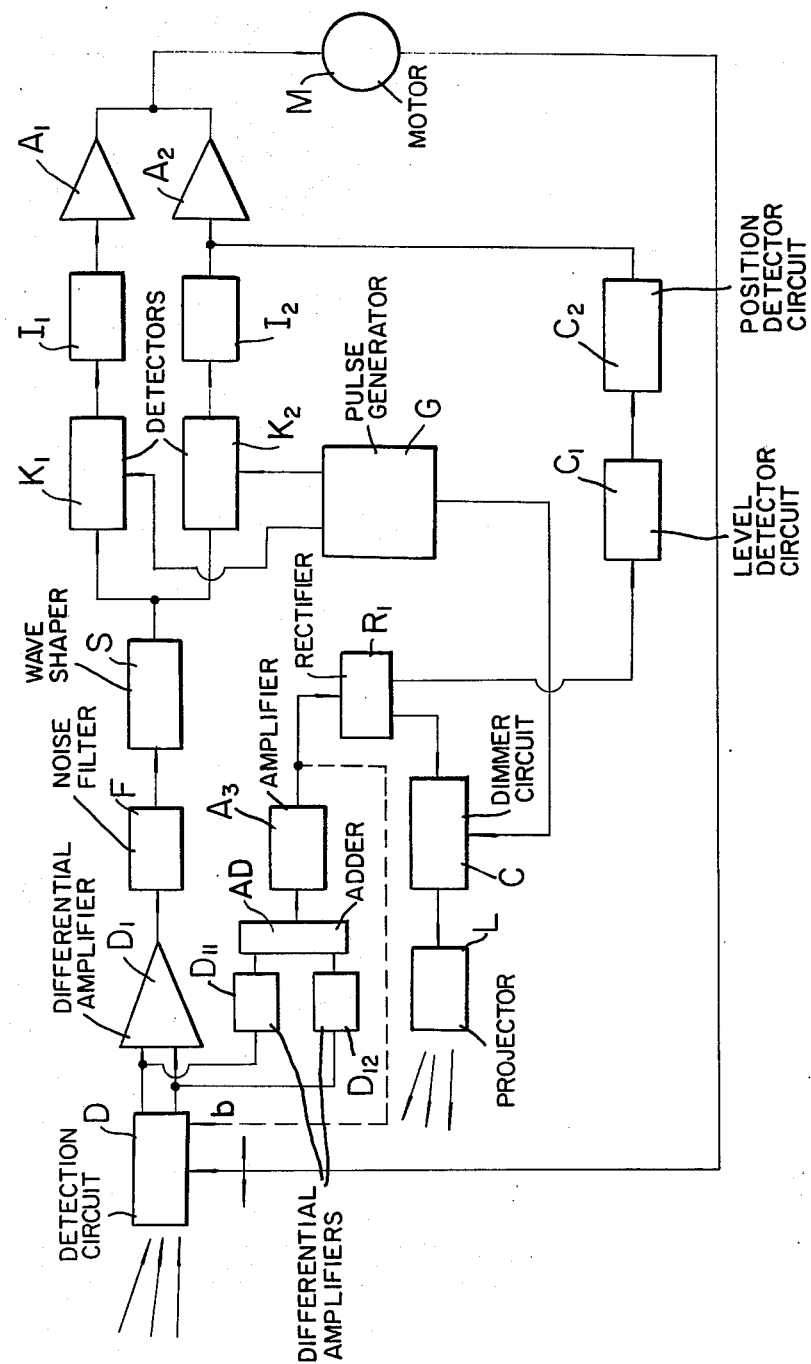
FIG. 2 and FIG. 3 are block diagrams illustrating an electronic circuit to be incorporated in the system of the present invention.

FIG. 2 is a block diagram of a servo-mechanism in a system embodying the present invention. The ray flux projected from a projector L is amplitude modulated as an appropriate frequency by the pulse from a pulse generator G. The ray flux, i.e. light, reflected by an object impinges on the ray receivers 11a and 11b in the optical system shown in FIG. 1. A photoelectric detection circuit D composed of bridges, etc., and a constant level noise elimination capacitor, photo-electrically converts the thus-detected flux to the output of a differential amplifier $D_1$. The output of the differential amplifier $D_1$ comprises signals having an amplitude and code corresponding to the difference in the amount of incident light impinging on the ray receivers 11a and 11b and to which amount of incident light is larger than the other.

The output of the differential amplifier $D_1$ has cyclic noise, espcially 100 Hz or 120 Hz noise from a commercial alternating current power source removed by a noise filter F and enters a wave form shaping circuit S. There the signal becomes almost equal to the pulse waveform supplied from a pulse generator G and enters a synchronism detector, where the signal is divided into two. One of the divided signals is phase inverted and synchronism detection is effected by the pulse from the pulse generator G. The output of the detector $K_1$ or detector $K_2$ is supplied only to one of the integrators $I_1$ or $I_2$ depending on the code of the signal. Thus it rotates the servo-motor M through an amplifier $A_1$ or an amplifier $A_2$ in a direction corresponding to each.

Rotation of the servo-motor M rotates the totally reflective mirror 10 in FIG. 1 to the direction of arrow b. This produces a new distribution pattern of the light between both ray receivers 11a and 11b. Thus, the system is gradually shifted so that the amount of light is balanced. It is possible to detect the direction of unbalance of the output of the ray receivers through the above mentioned signal shift and to set the position of the optical system 13 at proper position corresponding to the distance to an object.

On the other hand since the amount of ray impringing on the ray receivers varies noticeably depending on the distance to an object and its reflecting power, etc., the operating range of the photo-electric detection circuit D needs to be quite extensive. Therefore, it is difficult to avoid such shortcomings as unstable operation, etc. In order to prevent such shortcomings, the output of at least one of the ray receivers is applied to an amplifier $A_3$ which effects control of the projector L.

For this purpose, the two outputs of the detection circuit D in FIG. 2 are impressed, respectively, on the differential amplifiers $D_{11}$ and $D_{12}$. These serve as comparators of the basic input, and both their outputs are applied, after being added by an adder AD, to a rectifier circuit $R_1$ through an operational amplifier $A_3$. The amount of light from the projector L is controlled by a dimmer circuit C. The dimmer circuit C receives the output from the detector circuit D and the pulse signal from the pulse generator.

Of course the apparatus and method of FIG. 2 is only one example. It is possible to provide similar effects by methods such as adjusting the amount of feed back or amplifier as shown by the dotted line utilizing the output of at least one of the ray receivers. It is also possible to achieve these effects by controlling the amount of light impinging on the ray receivers within the detector D for example by adjusting load resistance, or by inserting a diaphragm in the ray receiver optical system.

Other controls are possible. For example when an object is located at infinity or when the energy of light flux reflected by an object is very weak for some reason, the optical system needs to be set at the infinite position or at an over-the-focus distance without delay. For this purpose the output of the amplifier $A_3$ is supplied to at least one of the servo-amplifiers, for example, the input terminal of $A_2$, through an input level detecting circuit $C_1$, and a constant position setting circuit $C_2$. The servo-motor M is then rotated to the prescribed position. In this drawing the synchronism detectors $K_1$, $K_2$ have opposing phases.

Figure 3:
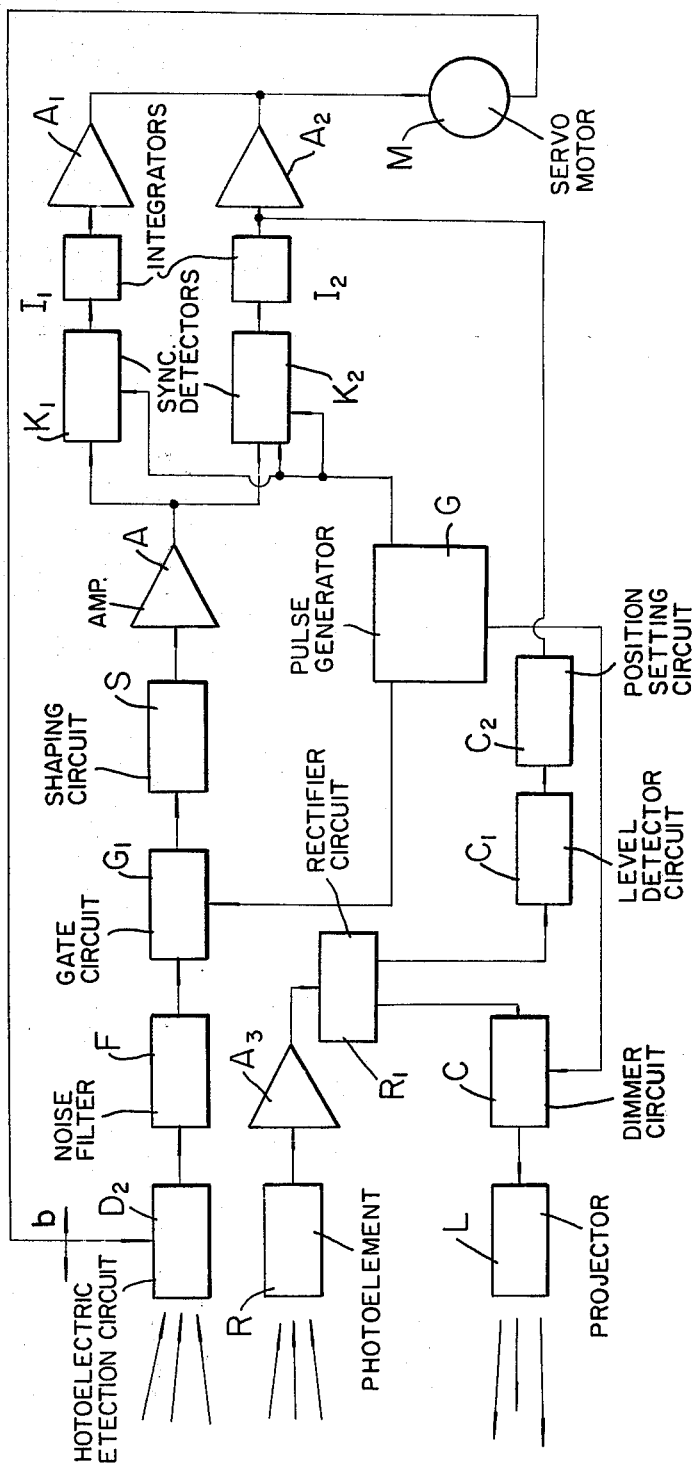

FIG. 3 is a block diagram of another example of the servo-mechanism in the system of the present invention. here a photo-electric element for detecting the input level of the ray receiver is provided separately and arranged to suit still another example shown in FIG, 6 to be described. It can also be applied for modifying the system shown in FIG. 1.

Figure 6:
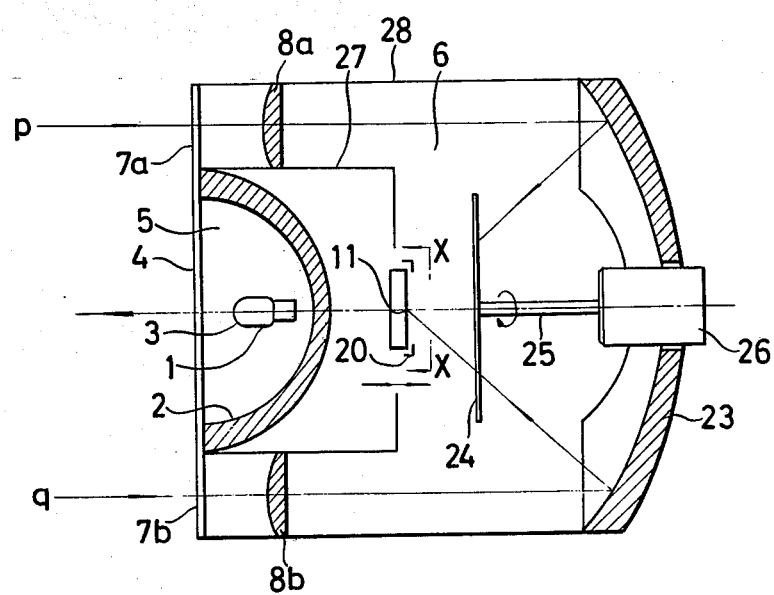
FIG. 6 shows still another example of the system according to the present invention.

As in the case of FIG. 2 the ray or light flux emitted from the projector L is amplitude modulated at a suitable frequency by the pulse supplied from the pulse generator G. The ray or light flux reflected by an object passes through an optical system such as shown in FIG. 1 or FIG. 6. It then enters the photo-electric detection circuit $D_2$ containing in it for example the differential amplifier $D_1$, and is converted to an electric output. The noise at a constant level contained in its signal is eliminated by the capacitor in the detection circuit $D_2$. Then the light flux passes through a noise filter F which eliminates 100 $H_2$ and 120 $H_2$ noise. A gate circuit $G_1$ allows passage only of the modulated ray flux projected from the projector L by the pulse from the pulse generator G. The signal after passing through the gate circuit $G_1$ posseses an amplitude and phase, in almost pure shape, corresponding to the state of discrepancy in the one or two light fluxes impinging on the receivers. Further, in order to give it almost the same form as the pulse, the signal is applied to a wave shaping circuit S and its output is amplified by the amplifier A.

The signal, after amplification, is divided into two and one of the two is applied to an in-phase synchronism detector $K_1$ while the other one of them is applied to an antiphase synchronism detector $K_2$. In these detectors synchronism detection is effected by the pulse and the output is supplied to either one of the integrators $I_1$ or $I_2$ corresponding to the phase of the alternating current generated in the light receivers. Next, this output causes the amplifier $A_1$ or $A_2$, to rotate the servo-motor M in a prescribed direction.

As is apparent from the above explanation the direction of rotation of the servo-motor is controlled by the phase of the alternating current generated at the light receiver. This corresponds to the information of the relative position of the ray receiver corresponding to the normal focusing position. Thus if an optical system such as mentioned above is also provided, the objective lens can be always set to a position corresponding to the distance to an object.

As has been explained before, in order to eliminate shortcomings such as unstable operation of an electronic circuit due to the difference in the amount of light impinging on the ray receivers, another photoelectric element R may be provided for input level detection. Its output is applied to the amplifier $A_3$, then the output from the amplifier $A_3$ is applied to the dimmer circuit C of the projector to control the amount of light emitted by the projector L. Moreover, when for instance an object at infinitely long distance is to be photographed or when the energy of the light flux reflected by an object is very weak for some reason, the optical system is set at an infinite position or at an over-the-focus distance without delay by the input level detection circuit $C_1$, the constant position setting circuit $C_2$. The circuit $R_1$ is a rectifying circuit.

Figure 4:
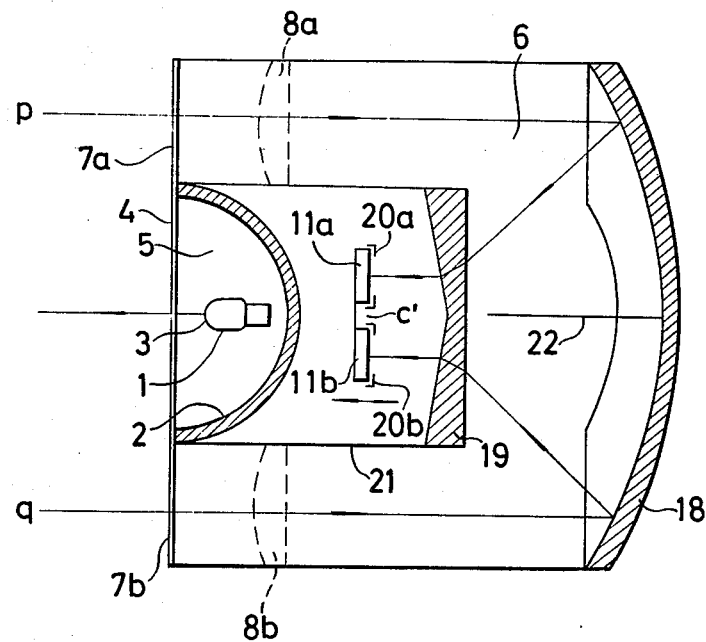
FIG. 4 shows another example of the system according to the present invention.

FIG. 4 shows still an another example of a system according to the present invention. In the drawing, while the projector 5 is shown as being same as the one in FIG. 1, a ray receiver system 6 having same optical axis with the projector 5 is positioned just behind the projector 5. The top portion of the receiver 6 consists of two large openings. At the openings, filters 7a, 7b exclude light having wavelengths outside the range of the projected light flux. The filters 7a, 7b can be common with the filter 4 of the projector 5. In the rear portion of said opening, a spherical mirror 18 and a butterfly shaped prism 19 have the same optical axis as that of the spherical mirror 18. The ray receivers 11a, 11b positioned with a separation zone C' intervening therebetween are arranged so that the light flux coming in through and the two openings is imaged, by the spherical mirror 18 and the butterfly shaped prism 19 on the light receivers 11a, 11b.

Masks 20a, 20b on the ray receivers cut out extraneous light. Two ray shielding plates 21 and 22 are positioned so that the two ray fluxes, upper and lower, will not impart undesired effects to the image by irregular reflection. The ray receivers 11a, 11b are positioned so that they can be simultaneously shifted to the direction of the arrow in parallel with the optical axis of the spherical mirror 18 and that of the butterfly shaped prism 19. Furthermore, the butterfly shaped prism 19 can be slightly shifted to the direction of optical axis so that the distance between the two light fluxes or beams reaching the ray receivers can be adjusted. Two cylindrical lenses 8a and 8b which are inserted as required for the reason mentioned above. Therefore when the cylindrical lenses 8a, 8b are omitted, the spherical mirror 18 may be replaced with a cylindrical mirror, or the shape and structure of the lamp 1 can be defined, as the means to provide a compressed light beam.

The system functions as follows.

The light flux generated at the lamp 1 is given sufficient directivity by the action of the spherical mirror 2 or the action of the rotating parabolic mirror and a condensor lens 3. The filter 4 allows only light flux having a specific wave length range to be projected on an object.

The light reflected by an object enters into the ray receiver optical system 6 through its two openings p, q. Noise rays having a different wave length range from that of the projected light flux are shielded by the filters 7a and 7b. The two ray fluxes or light beams passing through the filters 7a and 7b are compressed by the spherical mirror 18 and are refracted by the butterfly shaped prism 19. They emerge as two rays almost parallel to the optical axis after passing through the prism, and form a linear image of the light flux projected on the object. As the distance from the projector 5 to the object changes the distance between the two light fluxes or beams becomes either wider or narrower.

Figure 5:
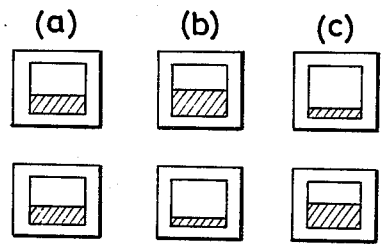
FIGS. 5a, 5b, 5c are drawings to explain the method of focus detection in the system of FIG. 4.

When the relative positions of the two beams, light or ray receivers and the masks are suitably selected, as shown in FIG. 5, the linear image on the ray receivers vary as indicated by (a), (b), (c) according to the change in the distance between the two ray fluxes, i.e. light beams, or the shifting of the ray receivers. If an optical system separate from this system is provided so that shifting of the ray receivers and that of the separate optical system are suitably coupled by some means, the image of the object by the optical system can always be properly focused. That is, if, when the light beams entering the receivers are equal as in (a) the relative positions of the ray receiver and the optical system correspond to the optimum focusing of the optical system, the cases (b), (c) correspond to situations when the optical system is not properly focused. Moreover, the cases (b), (c) during front focusing and rear focusing respectively, therefore the unbalance in the output of the both ray receivers have directivity. Thus if the ray receivers and the optical system being linked therewith are so moved as to eliminate the unbalance in the outputs of ray receivers depending on the above mentioned directivity, the image of the object by the optical system can always be focused.

FIG. 6 shows still another example of the system according to the present invention.

In the drawing, the projector 5 is shown with same arrangement with that of FIG. 1. Openings 7a', 7b' pass light to cylindrical lenses 8a and 8b. A reflective mirror 23 reflects light through a chopper 24 onto a ray receiver on photosensor 11, wherein the chopper may be omitted by using two ray receivers as shown in FIG. 4. Member 20 is a mask, 25 is a driving shaft for the chopper and 26 is a motor. The ray receiver 6 consists of the openings 7a, 7b, the cylindrical lenses 8a, 8b, the reflective mirror 23, the chopper 24, the ray receiver 11, and the mask 20. Each of 27 and 28 is ray shielding member. It is advisable to provide filters 7a, 7b for shielding such noise ray as having different wave length range than that of the projected ray at the openings 7a', 7b'. Practically a filter 4 should be arranged to cover the openings 7a', 7b' also. The ray receiver 11 may be shifted back and forth along with the optical axis of the reticle chopper 24 and the spherical mirror 23 as shown by an arrow. The motor 26 for driving the chopper 24 may be replaced with other driving mechanism.

The system mentioned above operates as follows.

Figure 7:
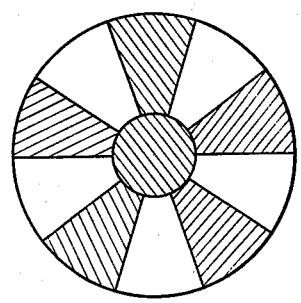
FIG. 7 and FIG. 8 show a mechanical chopper and a ray receiver with a mask, respectively, which are suitable for use in the system shown in FIG. 6.

The ray flux or light beam reflected by an object enters into the optical system 6 through both its openings 7a', 7b'. It is compressed into elongated cross-sectional images by the cylindrical lenses 8a, 8b which are enlarged and imaged again by the spherical mirror 23. The two light beams from the lenses are reflected toward optical axis of the spherical mirror 23 at positions depending on the distance to the object. In front or to the rear of the imaging or focal point two blurred images will be generated depending upon the discrepancy of the two beams or light fluxes. The reticle chopper 24 is a disk equally divided into an even number in its circumferencial directions and each of thus divided portions is alternately made transparent and opaque to the light flux, as shown in FIG. 7.

Figure 8:
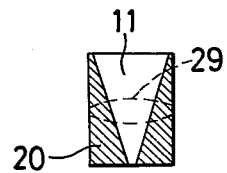

When such a reticle chopper is attached as shown in FIG. 6 and is rotated, the upper and lower ray fluxes or light beams will not reach the ray receiver 11 at the same time. Instead the upper and lower beams will reach the ray receiver 11 alternately along with the rotation of the chopper. The mask 20 on the ray receiver 11 forms an opening whose width varies gradually along the direction parallel to the axis connecting the two openings 7a', 7b', as shown in FIG. 8. When the ray receivers properly unite together at the imaging position formed by the two ray fluxes, the linear images 29 formed alternately by the two ray fluxes will coincide. Therefore, the outputs of the ray receivers when the ray flux $p$ images on it will be equal to that when the ray flux $q$ impinges on the same. When the position of the ray receiver 11 is farther from or closer to the spherical mirror 23 than the aforementioned position, the relative positions of the images by the ray flux $p$ and by the ray flux $q$ are different from each other. Thus the alternate outputs become different because of the action of the mask 20, and as a result alternating current is generated. It is apparent that the phase of said output of alternating current varies by 180° depending on whether the ray receiver is located in front of the proper focusing point or is in rear of the same.

In this system the ray flux or light beam reflected by an object is divided into two, and the chopper 24 causes each of the reflected beams to impinge on the ray receiver alternately. Focusing is detected by comparison of the size of the alternating current component of the output of the ray receiver. At the same time the phase of the alternating current component indicates whether the ray receiver is located in the front or in the rear of the proper focusing position.

Therefore if the shifting of the ray receivers 11 and the shifting of another optical system are adequately coupled by some means the image of an object by the optical system can be focused. The servo-mechanism used for coupling the optical systems in an automatic focus adjusting device is described with respect to FIG. 3.

Even in the case when the chopper is omitted and two photo-electric elements are used (FIG. 1, FIG. 4), it is convenient to make the mask 20 in a shape shown in FIG. 8.

Figure 9A:
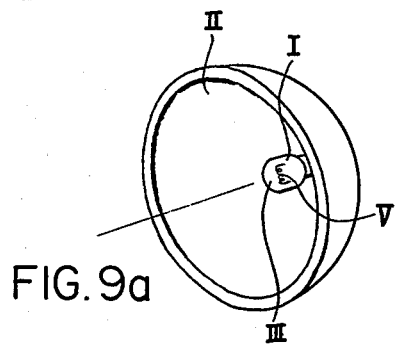
FIG. 9a and FIG. 9b show modified examples of important part of projecting system 5.
Figure 9B:
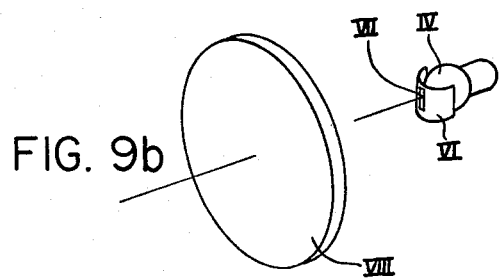

FIG. 9a and FIG. 9b show the case when the ray source itself is used as a flux linearizer or beam compressor so the ray is irradiated linearly on the ray receiver. In FIG. 9a a filament V of a lamp I is made so that the beam projected from the filament area itself of is distributed in the projection system 5 of FIG. 1 so that the means 10 direct it on the ray receivers 11a, 11b as a linear spot almost parallel to the dividing line C. Member II is a reflective mirror and III is a lens for preventing the divergence of direct ray to the front portion of the lamp I. When the lamp I and the reflective mirror 2 in FIG. 1 are simply replaced with the lamp I and the mirror II, in the example of FIG. 1 and the compressed beam almost parallel to the dividing line C is projected on the ray receivers 11a, 11b, the cylindrical lens 8 is not necessarily required. This is also true in the examples of FIG. 4 and FIGS. 6. But in the case of FIG. 4 while the separation zone C' is wider than the dividing line C, the distribution of the luminescent space of the filament will be such that the direction of macrodiagonal axis of the linear flux is almost parallel to the separation zone C' as in the case of FIG. 1. In the case of FIG. 6 a single ray receiver is used. A separation zone is not necessary. Thus the beam projected on the surface of the element or ray receiver assumes the shape of the luminescent portion of the filament as shown by 29 of FIG. 8.

In FIG. 9b, IV is a lamp without lens III, and the ray flux or light beam from the lamp IV is emitted to the front area through a slit VII of a slit plate VI which can also serve as a mirror, and is projected by a condenser VIII on an object as almost parallel light rays. When the device of FIG. 9b is incorporated in the projector systems of FIG. 1, FIG. 4 and FIG. 6, the slit VII provides a linear compressed beam. Thus it is naturally necessary to have a relative positional relationship established with the ray receiver.

At the same time when the projection optical system 5 is replaced with the projection system described in FIG. 9, a shielding means to prevent the light leakage from the lamp IV to the rear is necessary, and this shielding means may be so arranged that it performs active condensing function.

Figure 10:
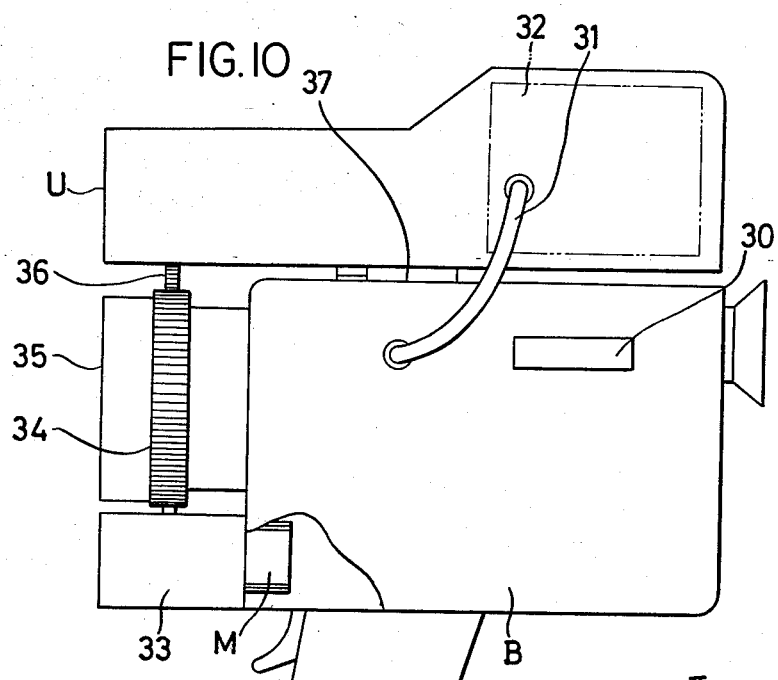
FIG. 10 is a drawing showing an example of the case when the system of the present invention is made in a unit and this unit is attached to a body of a camera.

FIG. 10 shows the automatic focus adjusting device which has been explained above, attached to a body of camera.

That is, an automatic focus adjusting unit U containing the light source and the ray receiver system for example shown in FIG. 1 and FIG. 2 is made as a separate unit from a body B of camera. When for example the unit U is attached to the camera body B automatic focus adjusting is done, while manual focus adjusting or an electric focus adjusting is done when the unit U is detached from the body B. Even when the unit U is attached to the body B, manual focus adjusting can be done. In order to realize the above mentioned set up, when the terminal of the unit U is connected to the terminal of camera, the device in FIG. 1 and FIG. 2 are formed, while when these terminals are disconnected, it may be so arranged for example as the servo-motor M is changed over to the circuit for electric focus adjusting in association with said disconnection. In FIG. 10, 30 is an electric focus adjusting button, 31 is a cable for automatically controlling the servo-motor M. A power source and electronic circuit storage portion 32 is provided within the unit U. A gear box 33 is driven by the servo-motor M. A gear 34 shifts a photographic lens 35. Member 36 is a feed back gear and 27 is a unit attaching shoe. It may be formed so that as the unit U is attached to the camera body B, the cable 31 is automatically connected only by the attaching process.

In order to make it suitable for use with manual focus adjusting such mechanism as conventionally used may be provided between the motor M and the specular bronze 14.

What is claimed is:
1. A distance detecting system comprising:
    ray projecting means for projecting a radiation ray toward an object whose distance is to be detected;
    ray receiving means offset from said ray projecting means for receiving the radiation ray reflected by the object at a position offset from the ray projecting means so that the reflected ray impinges on the position from an angle depending upon the distance to the object from the ray projecting means and for forming a ray path depending upon the angle, said ray receiving means including:
        ray compressing optical means for compressing the reflected ray from an illuminated zone into a linear form,
        first and second ray sensitive means for providing an electrical signal in response to the radiation ray when said ray is received, said ray sensitive means contacting each other at common borders thereof, and being arranged in the ray path with their common borders being almost parallel to the compressed linear form of the reflected ray from the illuminated zone,
        movable ray deflecting means arranged in the ray path for displacing the position on the first and second ray sensitive means of the compressed linear form of the reflected ray from the illuminated zone into a direction almost perpendicular to said common borders,
        said first and second ray sensitive means receiving the compressed linear form of the reflected ray by means of the ray deflecting means,
    whereby the compressed linear form of the reflected ray from the illuminated zone, which is compressed by the ray compressing means, is displaced by ray deflecting means on the basis of the electrical signals of the first and second ray sensitive means so as to position it on the common borders of the first and second ray sensitive means, and the distance to the object from the ray projecting means is detected on the basis of the amount of displacement of the ray deflecting means.

2. A system according to claim 1, in which the ray compressing optical means includes a cylindrical lens which converges the reflected ray into a linear form along the common borders of the first and second ray sensitive means.

3. A system according to claim 2, in which the ray deflecting means includes a rotatable reflecting mirror for displacing the position of the converged linear form of the reflected ray from the illuminated zone on the first and second sensitive means into a direction almost perpendicular to the common borders of the sensitive means, whereby the distance to the object is detectable on the basis of the rotation amount of the reflecting mirror.

4. A system according to claim 3, in which the ray projecting means includes means for emitting the radiation ray, and optical means for projecting the radiation ray emitted by the ray emitting means toward the object.

5. An automatic focusing system for an image forming optical system having an optical axis and movable along the optical axis for positioning an image of an object always at a predetermined position, comprising:
    ray projecting means for projecting a radiation ray toward the object;
    ray receiving means offset from said ray projecting means for receiving the radiation ray reflected by the object at a position offset from the ray projecting means so that the reflected ray impinges on the position from an angle depending upon the distance to the object from the ray projecting means and for forming a ray path depending upon the angle, said ray receiving means including:
        ray compressing means for compressing the reflected ray from an illuminated zone into a linear form,
        first and second ray sensitive means for providing an electrical output in response to the radiation ray when said ray is received, said ray sensitive means contacting each other at common borders thereof, and being arranged in the ray path with their common borders being almost parallel to the compressed linear form of the reflected ray from the impinged zone, movable ray deflecting means arranged in the ray path for displacing the position on the first and second ray sensitive means of the compressed linear form of the reflected ray from the illuminated zone into a direction almost perpendicular to said common borders, said deflecting means being connected operatively to the image forming optical system to change the position of the reflected ray from the illuminated zone on the first and second ray sensitive means in correspondence to the change of the position of the optical system on the axis, said first and second ray sensitive means receiving the compressed form of the reflected ray by means of the ray deflected means;

electrical circuit means for processing the outputs of the first and second ray sensitive means, said circuit means being coupled electrically to both said ray sensitive means for providing as an output an electrical signal in correspondence to the difference in outputs of both sensitive means;

driving means for driving the image forming optical system, along the optical axis on the basis of the output of the electrical circuit means, said driving means being operatively coupled to the optical system and electrically coupled to the electrical circuit means, said electrical circuit means stopping the driving means when the outputs of the first and second ray sensitive means are equal;

whereby the image forming optical system is driven until the compressed linear form of reflected ray from the illuminated zone is positioned on the common borders of the first and second ray sensitive means to perform focusing to the object.

6. A system according to claim 5, in which the ray compressing optical means includes a cylindrical lens which converges the reflected ray into a linear form along the common borders of the first and second ray sensitive means.

7. A system according to claim 6 in which the ray deflecting means includes a rotatable reflecting mirror for displacing the position on the first and second sensitive means of the linearly converged reflected ray into a direction almost perpendicular to the common borders of the sensitive means.

8. A system according to claim 7, in which the ray projection means includes means for emitting the radiation ray, and optical means for projecting the radiation ray emitted by the ray emitting means toward the object.

9. A distance detecting system comprising:
light emitting means;
optical means for projecting light emitted by the light emitting means toward an object whose distance is to be detected;
cylindrical lens means offset from said optical means for receiving the light beam reflected by the object at a position offset from the optical means so that the reflected light beam from an illuminated zone impinges from an angle depending upon the distance to the object from the optical means and for forming a light beam path depending upon the angle, said cylindrical lens means receives the light beam reflected by the object after being projected by the optical means and converges it into a linear form;
first and second photoelectric transducing means which provide an electrical signal in response to the light beam when said beam is received, said photoelectric transducing means contacting each other at common borders being almost parallel to the linearly converged light beam from the illuminated zone;
movable light deflecting means arranged in the light beam path for displacing the position of the linearly converged light beam from the illuminated zone on the first and second photoelectric transducing means into a direction almost perpendicular to the common borders;
said first and second photoelectric transducing means receiving the linearly converged light beam linearly converged by the cylindrical lens means by means of the light deflecting means;

whereby the light deflecting means is displaced on the basis of the electrical signals of the first and second photoelectric transducing means so as to position the linearly converged light beam from the illuminated zone on the common borders of the first and second photoelectric transducing means, and the distance to the object from the optical means is detected based on the amount of displacement of the deflecting means.

10. A system according to claim 9, in which the light deflecting means includes a rotatable reflecting mirror for displacing the position of the linearly converged light beam from the illuminated zone on the first and second photoelectric transducing means into a direction almost perpendicular to the common borders of the transducing means, whereby the distance to the object is detectable based on the amount of rotation of the reflecting mirror.

11. An automatic focusing system for an image forming optical system having an optical axis and movable along the axis for positioning the image of an object always at a predetermined position, comprising:
light emitting means;
optical means for projecting light emitted by the light emitting means toward the object;
cylindrical lens means offset from said optical means for receiving the light beam reflected by the object at a position offset from the optical means so that the reflected light beam from an illuminated zone impinges from an angle depending upon the distance to the object from the optical means and for forming a light beam path depending upon the angle, said cylindrical lens means receives the light reflected from the object after being projected by the optical means and converges it linearly;
first and second photoelectric transducing means which provides an electrical output in response to the light beam when said light beam is received, said transducing means contacting at common borders, and arranged in the light beam path with their common borders being almost parallel to the linearly converged light beam from the illuminated zone;
movable light deflecting means for displacing the position of the linearly converged light beam from the illuminated zone on the first and second photoelectric transducing means into a direction almost perpendicular to said common borders, said deflecting means being arranged in the light beam path and connected operatively to the image forming optical system so as to change the position of the converged light beam on the first and second transducing means in correspondence to the positional change of the optical system on the optical axis;

said first and second photoelectric transducing means receiving the light beam to be linearly converged by the cylindrical lens means by means of the light deflecting means;

electrical circuit means for processing the outputs of the first and second photoelectric transducing means, said circuit means being coupled electrically to both said transducing means to provide as an output an electrical signal corresponding to the difference in the outputs of both transducing means;

driving means for driving the image forming optical system along the optical axis on the basis of the output of the electrical circuit means, said driving means being coupled operatively to the optical system and coupled electrically to the electrical circuit means;

said electrical circuit means stopping the driving means when the outputs of the first and second photoelectric transducing means are equal;

whereby the image forming optical system is driven until the light beam linearly converged by the cylindrical lens means is positioned on the common borders of the first and second photoelectric transducing means so as to focus to the object.

12. A system according to claim 11, in which the light deflecting means includes:

a rotatable reflecting mirror for displacing the position of the linearly converged light beam linearly converged from the illuminated zone on the first and second photoelectric transducing means into a direction almost perpendicular to the common borders of transducing means, said mirror connected operatively to the image forming optical system and being rotated in correspondence to the position of the optical system on the optical axis.

* * * * *